United States Patent [19]
Baldauf

[11] Patent Number: 5,769,993
[45] Date of Patent: Jun. 23, 1998

[54] PROCESS FOR PRODUCING AN ELASTIC MULTILAYER WEB OF MATERIAL

[75] Inventor: Georg Baldauf, Laer, Germany

[73] Assignee: Amoco Corporation, Chicago, Ill.

[21] Appl. No.: 256,564

[22] PCT Filed: Nov. 13, 1993

[86] PCT No.: PCT/EP93/03187

§ 371 Date: Oct. 26, 1994

§ 102(e) Date: Oct. 26, 1994

[87] PCT Pub. No.: WO94/11189

PCT Pub. Date: May 26, 1994

[30] Foreign Application Priority Data

Nov. 14, 1992 [DE] Germany .......................... 42 38 541.5

[51] Int. Cl.[6] .......................... A61F 13/15; B32B 31/04; B32B 31/08; B32B 31/20
[52] U.S. Cl. .......................... 156/164; 156/163; 156/183; 156/229; 156/290; 156/292; 156/308.4; 156/494; 428/152; 604/373; 604/385.2
[58] Field of Search .................................. 156/163, 183, 156/229, 290, 292, 308.4, 494–496, 164, 197; 428/152; 604/373, 385.2

[56] References Cited

U.S. PATENT DOCUMENTS

| | | | |
|---|---|---|---|
| 4,606,964 | 8/1986 | Wideman ............................ | 156/164 X |
| 4,720,415 | 1/1988 | Vander Wielen et al. .......... | 156/183 X |
| 4,770,656 | 9/1988 | Proxmire et al. ................... | 604/373 X |
| 4,847,134 | 7/1989 | Fahren-Krug et al. ............. | 428/152 X |

*Primary Examiner*—Adrienne C. Johnstone
*Attorney, Agent, or Firm*—Steven L. Hensley

[57] ABSTRACT

Process for producing an elastic multilayer web of material consisting of a flexible elastic backing film made of a thermoplastic elastomer and a web of nonwoven material bonded in a crepe-like manner to both the top and bottom sides of the backing film, whereby the webs of nonwoven material are welded together and the weld bonds are distributed over the web of material in the form of a grid arrangement of spot welding points and at the same time yield areas of increased air permeability through the web of material. The following process steps are carried out:

a) guiding and stretching the backing film to at least (100+a) % of the unstretched length, b) separately guiding and stretching two webs of nonwove (11 and 12) to certain dimensions (100+b) % and (100+c) % while maintaining the following conditions: b <c<a, where the difference in the extent of stretching is great enough to produce a crepe-like appearance of the webs of nonwoven material and they are guided together to form a sandwich arrangement consisting of a backing film in the middle and webs of nonwoven material on the outside, c) the webs of nonwoven material are welded to the backing film with help of a roll having welding spikes as part of a welding d) tension an the backing film with the webs of nonwoven welded to it is released after leaving the welding station where 100% denotes the unstretched web.

2 Claims, 3 Drawing Sheets

PROCESS FOR PRODUCING AN ELASTIC MULTILAYER WEB OF MATERIAL

BACKGROUND AND SUMMARY OF THE INVENTION

This invention concerns a process for producing an elastic multilayer web of material consisting of a flexible elastic backing film and a thermoplastic elastomer and a nonwoven web 5 attached in a wavy pattern to both the top and bottom sides of the backing film, whereby the latter are welded together and the weld joints are distributed over the web of material in the form of a grid-like arrangement of spot welding areas and also yield areas of increased air permeability, with the following process steps:
a) guiding and stretching the backing film to at least (100+a) % of the unstretched length,
b) guiding two nonwoven webs separately and joining them to form a sandwich arrangement consisting of the backing film in the middle and nonwoven webs on the outside,
c) welding the nonwoven webs to the backing film with the help of a cylinder having welding spikes as part of a welding station,
d) releasing the tension on the backing film with the nonwoven webs welded to it after leaving the welding station.

(Note: "1100" denotes the unstretched length.)

Such a process is described in European Patent A 2,274, 752 especially with reference to FIGS. 16 to 18 in that patent specification Elastic multilayer webs of material that are produced as laminates are used, for example, as elastic sealing cuffs in manufacturing baby diapers. The laminate should be impervious to liquids but should be gas permeable so it is pleasant to wear. It should be like a textile from both a visual and a haptic standpoint. Therefore, as indicated above, a flexible backing film which should be impermeable to liquids and should not be self-sticking is bonded to appropriate webs of a nonwoven material in a wavy pattern. In general, an autogenous welding process is used such as ultrasonic welding or heat welding.

In the known process the welding spots are also designed as perforations which serve to allow ventilation.

Welding is performed with the backing film stretched or partially stretched, in which case the stretching is performed just before the film enters the welding station. If the nonwoven webs are then applied to the backing film in an unstretched condition or if they are less stretched than the backing film they will pucker and develop a wavy pattern when the backing film is released again after passing through the welding station. Thus all three layers are welded together, forming holes with the material fused around the edges of these holes.

In the state of the art described above, suitable combinations of materials are mentioned. Such materials— thermoplastic elastomers— are also suitable for the present case. In particular, the backing film is made of a blended PE/PE copolymer. However, other materials such as block copolymers of A—B—A' type are also suitable.

Disadvantage of the known web of material is that when it is stretched for use purposes, the webs of nonwoven attached in a wavy (crepe-like) manner to the top and bottom sides of the backing film also become stretched, thus destroying the textile-like impression given by the web of material. In addition, large perforations are also formed in an unwanted manner.

The problem was to develop a process for producing an elastic multilayer web of material that will yield a product that would retain its textile-like appearance in the desired fluffy form even when stretched to the limits of elasticity.

This problem is solved by a process of the type described initially which is characterized in that the two webs of nonwoven are guided together and then stretched to a specific extent (100+b) % or (100+c) % while maintaining the following condition:

b <c<a where the differences in the extent of stretching (of the backing film and of nonwovens 1 and 2) are great enough to yield a wavy or crepe-like layer of the web of nonwoven material. Then, steps b and c mentioned initially are carried out (actual values for a, b and c are as follows: a: 20 to 100; c about 5 and b 0 to 2).

Thus with the new process the upper and lower layers of nonwoven are brought together with the backing film at different degrees of stretching. Preferably one web of nonwoven remains completely unstretched while the other undergoes a prestretching which corresponds approximately to half the stretch applied to the backing film, in other words, a≈2c. In the relaxed state, the material has the known fluffy creped appearance of known woven laminate sheeting. When stretched to the point that the nonwoven web which has been prestretched to the greatest extent lies flat on the backing film, the other web of nonwoven still has enough storage length in the puckered areas to appear sufficiently fluffy.

Instead of perforating the entire laminate, an elastic film is stretched and placed in that condition between two webs of nonwoven material held under a low tension. Then the three layers of material that are brought in contact are welded together at numerous small spot. The welding takes place only between the webs of nonwoven material. The elastic film is destroyed at the welding spots at the moment of energy input, thus forming perforations that enlarge due to the tensile stress applied and thus are not involved in the welding. The finished product then consists of two layers of nonwoven material bonded together with a perforated elastic film inbetween them, held together mechanically by the points of contact (grid points) thus formed.

Preferably the following values are used for stretching: b= between 0 and 2; c≈ between 3 and 20; a= between 40 and 100.

Another problem with the laminate presented here is that although there is adequate ventilation through the perforations of a web of material produced by the known process, it nevertheless has the disadvantage that the woven web of laminate is so permeable to air that it is no longer held securely by the gripping devices that operate at a vacuum. Thus, the problem arises of making these webs of material processable in sections for vacuum handling equipment. Thus, the welding of the webs of nonwoven material to the backing film, which is usually done with the help of spot welding devices using ultrasonic welding processes, would have to take place in such a way that first, an adequate adhesive strength of the webs of nonwoven to the backing film is achieved, while secondly, an adequate and physiologically necessary ventilation is assured, and thirdly, the material nevertheless remains processable on equipment that operates with a vacuum.

To solve this part of the problem, it is proposed that the backing film merely be thinned out in the area of the spot welding spots while retaining the substance of the web of nonwoven material. Thus, it is no longer perforated but instead a yielding of the film and a compression of the webs of nonwoven onto the top and bottom sides are achieved with the use of relatively fine spot welding spikes, so that apparent perforations are discerned at first glance but these so-called perforations are actually sealed by very fine screen-like areas of the nonwoven material.

Therefore, the special design of the spot welding points as well as the equipment used to manufacture the spot welding points are essential to this invention, even when taken separately. The welding is preferably performed in such a way that the total area of the spot welding points relative to the stretched area of the backing film yields a ratio of 0.5 to 5:100.

A device for carrying out the process according to this invention is equipped with supply rolls, stretching mechanisms, a welding station and downstream receiving or wind-up rolls, whereby the welding station is equipped with a roll having welding spikes and mating pressure elements over which the web can be guided. The outer contact area of the welding spikes constitutes 0.5 to 5% of the total peripheral area of the roll. Preferably the welding spikes are truncated conical shapes where the angle of taper of the cone is between 40° and 70°, preferably 60°. The outer contact area of the welding spikes preferably has a square outline, but preferably rounded in the corner areas.

In accordance with the welding areas, front lines that are produced by the corresponding front lines of the welding spikes are produced relative to the direction of travel of the web of material. It has been found that if the front line is at a slightly inclined angle—for example, optimum adhesion results can be achieved if the angle made by the front line to the direction of travel of the web of material differs from a right angle by approximately 1° to 5°. This causes lateral stretching of the material in the transverse direction. Resonance effects between the sonotrode belonging to the welding station and the web of material (sheeting) are thus prevented. This also yields a higher production rate.

It is also advantageous if the outer flat contact surface of a welding spike is kept much smaller than the known size of the perforations with such webs of woven laminates. In this case the size should be between 0.2 and 0.6 mm$^2$.

It is also advantageous if 15 to 40 welding spikes are provided per cm of width of the web of material, yielding a corresponding number of welding spots located in a front line. Preferably there should be 12 to 16 welding spots for a width of 50 mm of a web.

The distance between the front lines is between 7 and 10 mm, but 8 mm has proven to be the optimum distance. As is already known, the arrangement of welding spikes from one front line to the next should be such that they are offset relative-to each A other.

The resulting product, namely the woven laminate web, thus has a backing film consisting of, for example, 0.02 to 0.06 mm thick TPE film in the middle with another layer consisting of webs of nonwoven applied in creped form to it. For example, an extruded polyolefin such as polypropylene produced by the usual nonwoven production processes, for example, as a corded fiber nonwoven, a spun bonded nonwoven, a melt blown nonwoven or a combination of such process steps is suitable for use as the nonwoven material. In addition, the nonwoven may be bonded by chemical, mechanical or thermal methods.

BRIEF DESCRIPTION OF THE DRAWINGS

An embodiment of the process and the resulting product will now be illustrated on the basis of the figures, which show the following.

DETAILED DESCRIPTION

Figure 1:
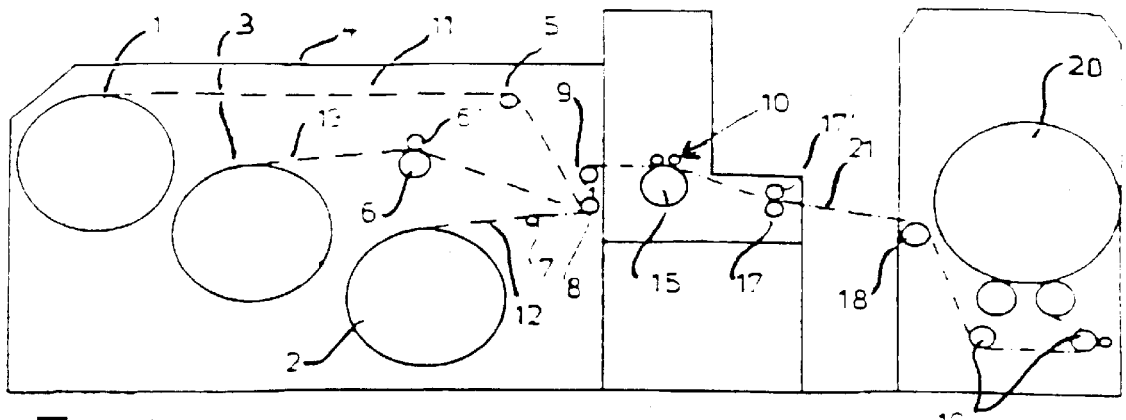
FIG. 1 shows a schematic side view of a device for producing a laminated web of material according to this invention.

FIG. 1 shows a schematic diagram of a device for producing an elastic multilayer web of material 21. The web of material 21 is composed of a flexible backing film 13 and a web of nonwoven 11 and 12 attached to the top and bottom sides of the backing film in a crepe-like pattern. Nonwoven webs 11 and 12 are at first completely flat, without any embossing or any special pretreatment. In the unstretched state the nonwoven web has a thickness of approximately 0.1 to 0.5 mm. For example, this may be a spun bonded nonwoven such as that known in the state of the art. A supply of the nonwoven web 11 is on a supply roll 1 and is guided without any additional tension—in other words, only with the required tensile stress—over guide roll 5 to guide roll 8. A second supply roll 2 has a web of nonwoven 12 of a same or similar quality but it is stretched over a supporting roll 7 or over a stretching roll (not shown) and thus has a length of 100+c in comparison with the original length of 100.

Furthermore, there is also a third supply roll 3 which has a rubber elastic backing film 13 such as TPE (=thermoplastic elastomer) film. For example, this may be a non-self-sticking film approximately 0.04 nm thick of SEBS material. The film material does not have any prefabricated perforations or connecting points. The backing film 13 is stretched over a stretching device which consists essentially of two rolls 6 and 6' which stretch the film from its original length of 100 to 100+a. This stretch is at first retained during the subsequent operations. The three films 11, 12 and 13 are brought together on guide roll 8 to form a sandwich arrangement which is guided over guide roll 9 and then arrives at welding station 10 where there is a welding spike roll 15 and a mating electrode (sonotrode) 10. As described below, the roll 15 has numerous welding spikes 25 which bond the stretched flat sandwich arrangement of the three films 11, 12 and 13 together with the help of UHF welding. In this process the outer contact surfaces of the welding spikes which have a rounded square shape press the layers of nonwoven material together and against the sonotrode 10, resulting in complete fusion of the backing film in the area of the contact points, while retaining the substance of the web of nonwoven (see FIG. 8). Therefore, the top and bottom webs 11 and 13 of the nonwoven are bonded together without resulting in holes in the web of material. Seemingly open areas 29 can be observed in the weld areas 22 but these apparent holes are sealed off by a fine network structure preserved from the random arrangement of nonwoven fibers.

Figure 2:
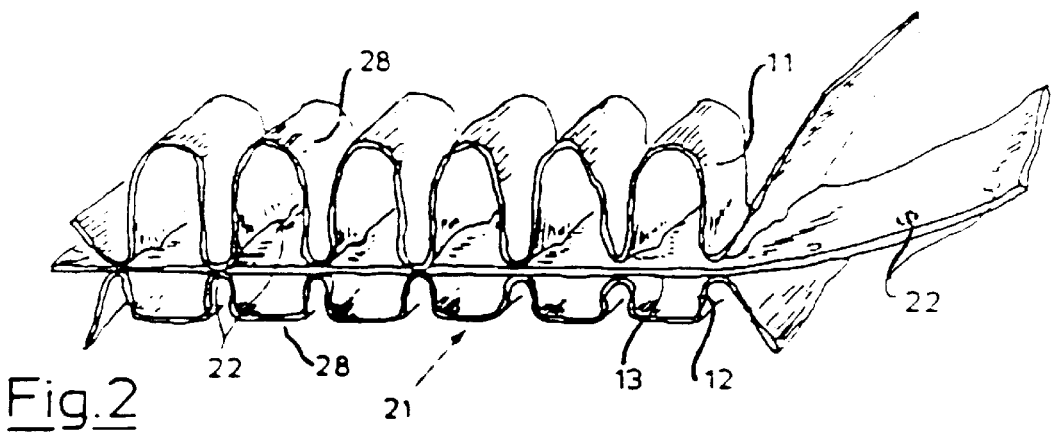
FIG. 2 shows the material in unstretched form.

The welded web of material 21 then goes to a pair of nip rollers 17, 17' and then the tension on the web is released. The backing film contracts back to its original length, thus forming clustered areas 28, 28' on the top and bottom of the laminate. The top film of nonwoven 11 which was previously almost unstretched then forms higher bunches or puckers 28 than the stretched nonwoven film 12 (bunch 28') (see FIG. 2).

The finished unstretched web of material is wound onto a supply roll 20 after first passing over additional guide rolls 18 and 19.

As already indicated above, the backing film 13 was guided to the lamination point with a stretch of 100+a, the nonwoven film 12 with a stretch of 100+c and the nonwoven film 11 with practically no stretch, in other words, with the stretch based only on the tensile stress, i.e., with a stretch of 100+b. In the present case, the relationship would thus be b=0<a<c. However, the possibility should not be ruled out that the backing film 11 is also introduced at a certain bias tension. Again in this case according to this invention the following relationship should hold:

b<a<c.

Figure 3:
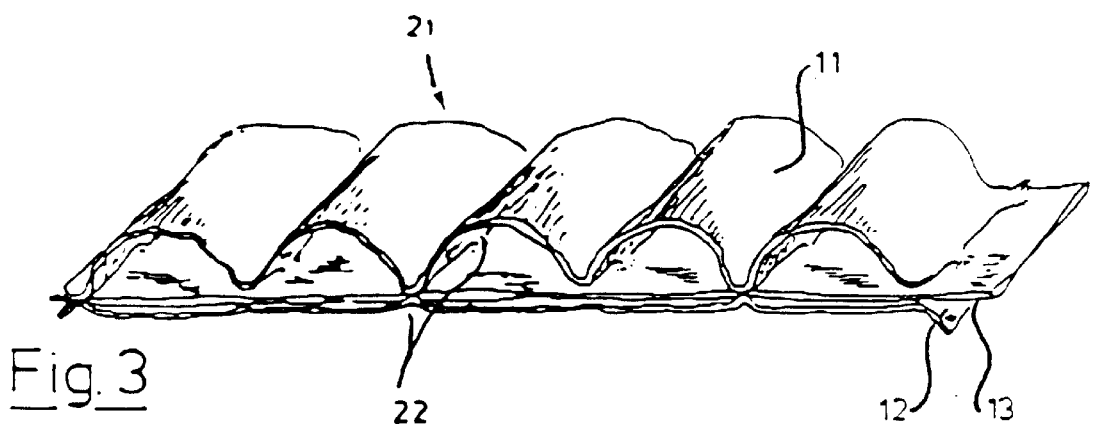
FIG. 3 shows the material in stretched form.

If the resulting web of material 21 is stretched until the somewhat smaller bunches 28' have also stretched (FIG. 3) there still remain small bunches 28, so the entire material presents a "fluffy" impression even when stretched.

Figure 4:
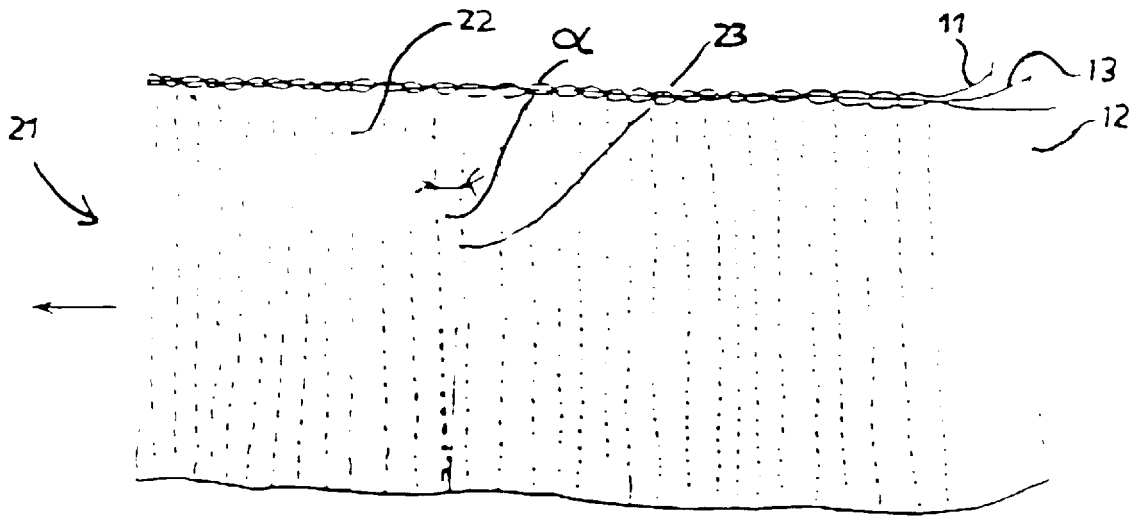
FIG. 4 shows a top view of the material (approximately natural size).

FIG. 4 shows a top view of a finished web of the laminate material. In comparison with the total area, the very small weld spots 22 take up only a very small area. On the whole, the area ratio of the weld spots to the total area is approximately 1 to 100.

As also shown in this top view, the "front lines" 23 which are formed by a row of weld spots 22 across the direction of travel L of the web of material are arranged at an angle a that differs from the right angle relative to the direction of travel. The angle a is approximately between 1° and 5°, preferably approximately 2.5°. This offset arrangement has proven to be especially advantageous because it almost completely prevents wrinkling of the web of material when operating at a high speed. Another advantage that could not have been foreseen is that resonance phenomenon no longer occur in the area of the spiked roll.

The design of the welding spike roll which is illustrated with reference to FIGS. 5 to 7 forms an essential element of this invention. FIG. 6 shows a top view of a small portion of the periphery of the spiked roll. The spiked roll 15 which has a diameter of approximately 250 mm has numerous welding spikes 15 arranged with an inclined front line arrangement on the surface of the roll as shown in FIG. 6. For illustration purposes, the outline of sonotrode 10 which is positioned nearby is also shown with dotted lines. Thus the bottom of sonotrode 10 forms a rectangle arranged at a skewed angle to the front line arrangement of the welding spikes. A similar sonotrode is also arranged on the other side of the roll.

Figure 5:
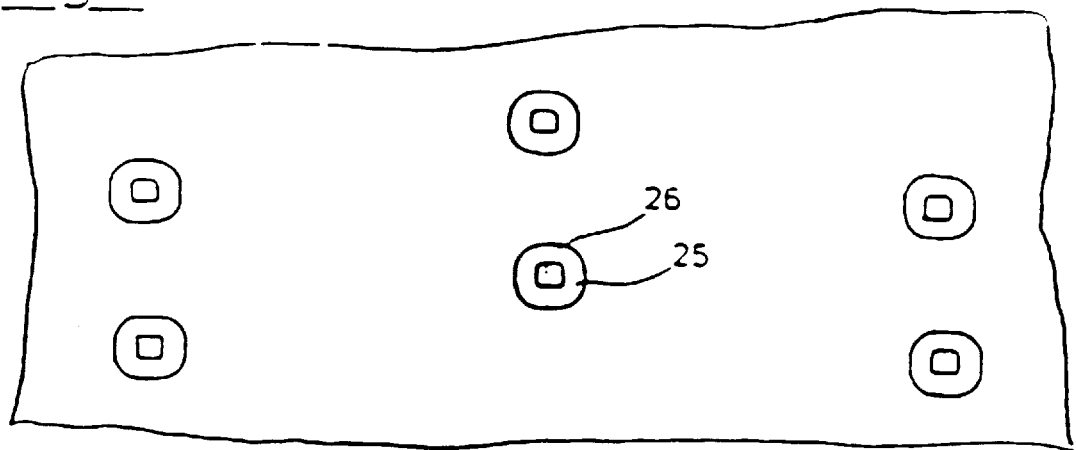
FIG. 5 shows an enlarged view of a detail of the spiked roll surface.
Figure 7:
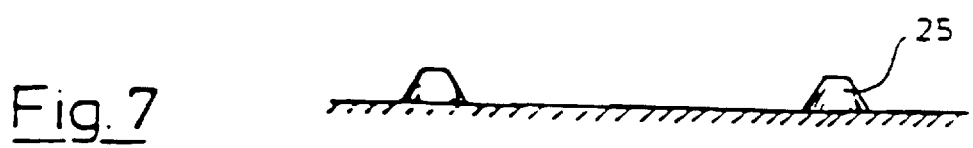
FIG. 7 shows a sectional view of the welding spikes.
Figure 6:
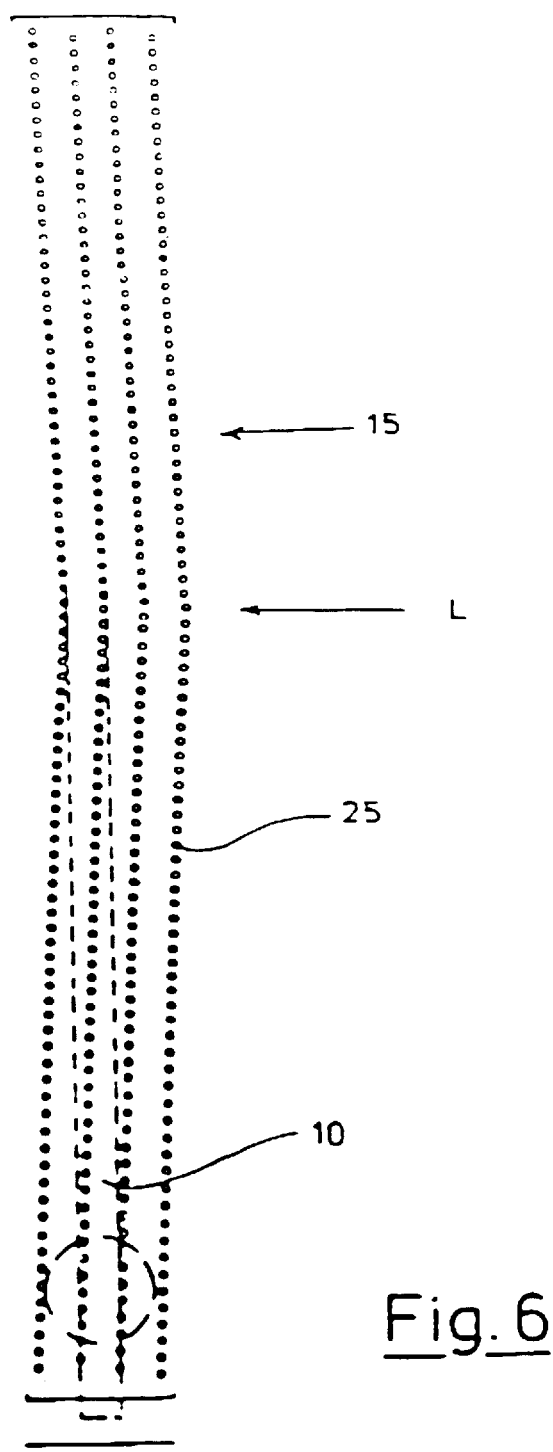
FIG. 6 shows a portion of the surface of the spiked roll.

As shown in FIGS. 5 and 7, the welding spikes 25 are short truncated conical shapes approximately 0.8 mm high with an angle of curvature? of 60°. The cones have an almost square welding contact area having an area of approximately 0.25 mm$^2$ ground to form a parallel to the peripheral curvature of the roll, in other words also a rounded surface. The distance between them in the direction of travel L is approximately 8 mm. The welding spikes have a distance of 3.46 mm between them.

The grid-like arrangement of welding spikes 25 is the exact mirror image of the arrangement of welding spots 22 on the web of material 21 as shown in FIG. 4. A portion of the spiked roll 25 rolls over the web of material illustrated in FIG. 4, resulting in rows of open areas 29 arranged at an angle a to the direction of travel.

It has been found that the air permeability of this web of material amounts to 200 l/m$^2$·sec in the stretched state when the measurement is performed with a pressure difference of 2 mbar and the weld spots constitute approximately 1% of the total area and there are 14 weld spots per 50 mm in width of the laminate. Nevertheless, the adhesion of the laminate is very good, amounting to 4N/50 mm$^2$.

Figure 8:
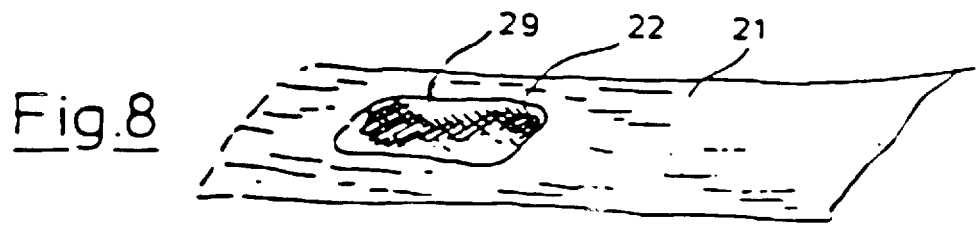
FIG. 8 shows the embossing area of a welding spike.

The material itself appears to be a very fine-pored material. FIG. 8 shows that a weld area yields an open area 29 in the web of material 21 which is practically a window opening (even in the stretched state) which is closed by a fine filmy gauze 30 which allows the physiologically required ventilation but. nevertheless presents enough air resistance so that even when portions of the web of material 21 are stretched, they can still be manipulated with vacuum devices. In the unstretched state the web of nonwoven has a thickness of 0.1 to 0.5 mm. In the unstretched state, the laminate has a thickness of 5 to 15 mm.

On the whole, this material thus offers advantages in terms of both production and processing.

I claim:

1. Process for producing an elastic multilayer web of material consisting of a flexible elastic backing film made of a thermoplastic elastomer with a web of nonwoven material attached in a crepe-like pattern to both the top and bottom sides of the backing film, whereby the webs of nonwoven material are welded together and the welds or bonded spots are distributed in the form of a grid of spot weld points over the multilayer web of material and at the same time areas of increased air permeability through the multilayer web of material arc obtained, with the following process steps:

a) guiding and stretching the backing film to at least (100+a) % of the unstretched length, b) separately guiding the two webs of nonwoven material (11 and 12) and joining them to form a sandwich arrangement consisting of the backing film in the middle and the webs of nonwoven material on the outside, c) welding the webs of nonwoven material to the backing film with the help of a roll having welding spikes as part of a welding station (10), d) releasing the tension on the backing film with the webs of nonwoven material welded to it after leaving the welding station, the process characterized by the fact that the two webs of nonwoven material (11 and 12) are guided and stretched to certain dimensions (100+b) % and (100+c) % while maintaining the following condition:
    b<c<a
    where the difference in the extent of stretching is great enough to produce the crepe-like pattern in the nonwoven webs, and then steps c and d are carried out.

2. Process according to claim 1, characterized in that the b=0, in other words the first web of nonwoven material (11) is unstretched when guided through the welding station (10).

* * * * *

UNITED STATES PATENT AND TRADEMARK OFFICE
CERTIFICATE OF CORRECTION

PATENT NO. : 5,769,993        Page 1 of 2
DATED      : June 23, 1998
INVENTOR(S) : Georg Baldauf It is certified that error appears in the above-identified patent and that said Letters Patent is hereby corrected as shown below:

| Col. | Line | |
|------|------|---|
| 1 | 27 | reads "(Note: "1100" denotes" should read --(Note: "100" denotes-- |
| 1 | 28-9 | reads "European Patent A 2,274,752" should read --European Patent A 0 274 752-- |
| 1 | 30 | reads "specification Elastic" should read --specification. Elastic-- |
| 2 | 41 | reads "c≈ between" should read --c= between-- |
| 3 | 47 | reads "relative-to each A other." should read --relative to each other.-- |

UNITED STATES PATENT AND TRADEMARK OFFICE
CERTIFICATE OF CORRECTION

PATENT NO. : 5,769,993
DATED : June 23, 1998
INVENTOR(S) : Georg Baldauf

It is certified that error appears in the above-identified patent and that said Letters Patent is hereby corrected as shown below:

| Col. | Line | |
|---|---|---|
| 4 | 30 | reads "0.04 nm"<br>should read --0.04 mm-- |
| 5 | 21 | reads "arranged at an angle a that"<br>should read --arranged at an angle α that" |
| 5 | 23 | reads "The angle a is approximately"<br>should read --The angle α is approximately-- |
| 5 | 56 | reads "angle a to the direction"<br>should read --angle α to the direction-- |
| 6 | 11 | reads "ventilation but. nevertheless"<br>should read --ventilation but nevertheless-- |
| 6 | 54-5 | reads "characterized in that the b=0,"<br>should read --characterized in that b=0," |

Signed and Sealed this

Sixth Day of October, 1998

Attest:

BRUCE LEHMAN

Attesting Officer

Commissioner of Patents and Trademarks